(12) United States Patent
Parrott (10) Patent No.: US 9,558,214 B1
(45) Date of Patent: Jan. 31, 2017

(54) SECONDARY MAPPINGS TO ENABLE CODE CHANGES WITHOUT SCHEMA UPDATES

(71) Applicant: Amazon Technologies, Inc., Reno, NV (US)

(72) Inventor: David J. Parrott, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/714,739

(22) Filed: May 18, 2015

Related U.S. Application Data (63) Continuation of application No. 13/405,075, filed on Feb. 24, 2012, now Pat. No. 9,037,614.

(51) Int. Cl.
*G06F 17/30* (2006.01)

(52) U.S. Cl.
CPC ... *G06F 17/30292* (2013.01); *G06F 17/30525* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 6,574,631 B1 | 6/2003 | Subramanian et al. | |
| 7,031,956 B1 | 4/2006 | Lee et al. | |
| 9,037,614 B1 | 5/2015 | Parrott | |
| 2006/0026154 A1 | 2/2006 | Altinel et al. | |
| 2009/0248739 A1* | 10/2009 | Cao | G06F 17/30607 |
| 2010/0287208 A1 | 11/2010 | Mao et al. | |
| 2011/0238709 A1 | 9/2011 | Liu et al. | |

OTHER PUBLICATIONS

"Non Final Office Action dated Jan. 3, 2013" received in U.S. Appl. No. 13/405,075.
"Final Office Action dated Apr. 15, 2013" received in U.S. Appl. No. 13/405,075.
"Non Final Office Action dated Aug. 14, 2013" received in U.S. Appl. No. 13/405,075.
"Final Office Action dated Apr. 4, 2014" received in U.S. Appl. No. 13/405,075.
"Non Final Office Action dated Nov. 19, 2014" received in U.S. Appl. No. 13/405,075.
"Notice of Allowance dated Feb. 2, 2015" received in U.S. Appl. No. 13/405,075.

* cited by examiner

*Primary Examiner* — Alex Gofman
*Assistant Examiner* — Umar Mian
(74) *Attorney, Agent, or Firm* — Hogan Lovells US LLP (57) ABSTRACT

Systems and methods are described for using secondary mappings in an Object Relational Mapping (ORM) system to enable source code changes to be implemented and carried out without requiring updates to the database schema. In order to use secondary mappings, one or more attributes of an object in the ORM system are annotated to indicate that they are secondary mapped attributes. The annotation can indicate to the ORM system that the various operations (e.g. read operations, write operations) referencing attributes of the object may need to be remapped if the column for the attribute being referenced does not actually exist in the database. For example, if no column is directly mapped to the attribute being referenced, the ORM system can remap the operation to point to a secondary data structure (e.g. a map stored in-memory) that will be used to store the value for that attribute.

20 Claims, 6 Drawing Sheets

SECONDARY MAPPINGS TO ENABLE CODE CHANGES WITHOUT SCHEMA UPDATES

CROSS-REFERENCE TO RELATED APPLICATION

This application is a continuation of U.S. application Ser. No. 13/405,075, entitled "SECONDARY MAPPINGS TO ENABLE CODE CHANGES WITHOUT SCHEMA UPDATES," filed Feb. 24, 2012, the entire content of which is herein incorporated by reference.

BACKGROUND

In software development, source code is often modified, recompiled and rebuilt in order to provide updates, eliminate errors and bugs, and to enable additional functionality. When a software application is database-backed, these source code changes may sometimes require updates to the database schema before the modified code can be executed. For example, if a change to the source code references a new property or attribute, then the database schema would need to be modified to reflect the new attribute before the source code can be validly executed against the database. As a result, there is often a tight integration that exists between changes to the source code of a particular application and the schema updates necessary to enable those changes to perform the intended functionality. In many cases, however, it is tedious and impractical for developers to perform schema updates every time source code is changed because schema updates are not generally subject to the same compilation, deployment, rollback and other processes that are inherent in software code development.

Object relational mapping (ORM) systems are used to convert data between entities that may use different data types or formats. For example, an ORM system typically builds a virtual database by creating mappings between objects and attributes residing in-memory and the tables and columns stored in the database. While ORM systems are useful for reducing the amount of code that is written by software developers, they are generally subject to the same limitations and restrictions between source code changes and database schema updates mentioned above.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for providing software updates and modifications. In particular, the various embodiments provide approaches for decoupling source code changes from requiring updates to a database schema.

In accordance with various embodiments, techniques are described for using secondary mappings in an Object Relational Mapping (ORM) system to enable source code changes to be implemented and carried out without requiring updates to the database schema. Conventionally, an ORM system maintains a set of mappings between objects residing in memory and the tables residing in the database. In particular, the ORM system typically maps each attribute of the object in memory to a column in the database.

In order to use secondary mappings, one or more attributes of an object in the ORM system may be annotated as being secondary mappable attributes. This annotation can indicate to the ORM system that the various operations (e.g. read operations, write operations) referencing these attributes of the object may need to be remapped if the column for the attribute being referenced does not actually exist in the database. For example, if no column is directly mapped to the attribute being referenced, the ORM system can remap the operation to point to a secondary data structure (e.g. a map stored in-memory) that will be used to store the value for that attribute.

The secondary mapping attribute can thus dynamically re-map reads and writes to an alternative attribute lookup that could, in one embodiment, be modeled as a JavaScript Object Notation (JSON) hash map stored in a specially-designated column of the table. In accordance with at least one embodiment, the usage of the secondary mapping feature would require all eligible tables to have a single column (e.g. text column) added to the database table that corresponds with the ORM object, specifically for storing the secondary values. Behavior of the read/write operations would then be dependent on the existence of the actual column in the database (i.e. the column directly mapped to the attribute being referenced). In accordance with alternative embodiments, the secondary column can be added to a separate database table (e.g. a shadow table) that is created for storing secondary attributes.

In accordance with an embodiment, if the actual column for the attribute does not exist in the database, all reads and writes would be re-mapped directly to the in-memory map. Before the ORM writes the object to the database, it would serialize the map to the designated column. When reading the object back from the database, the map would be undefined and only re-constituted on-demand (by either read or write request to one of the secondary mapping columns).

In accordance with an embodiment, once the directly mapped column for the attribute is added to the database, reads can still continue to be performed from the in-memory map. If the map has a value, that value is returned. If the value is not present, the value from the actual column is returned instead. Writes, on the other hand, can store directly to the column and also remove any mapped value from the in-memory map. Before storing the object to the database, the map is inspected and any keys which are no longer necessary are removed and their value populated in the corresponding columns, then whatever values remain in the map are serialized as before.

In accordance with various embodiments, the use of the secondary mapping feature can enable the system to compile and execute source code changes without having to first update the database schema. For example, if the source code of an application references a new attribute that has not yet been defined in the database schema, the ORM system can treat that new attribute as a secondary mapped attribute and store any values for that attribute into the JSON hash map as described above. Subsequently, when the database schema is updated to create the column for the new attribute, the ORM system can begin storing the values into the newly created column and clean up any old values from the hash map. In this manner, the developer can implement source code changes without having to first update the schema of the database to reflect all the possible changes to the data objects that would be caused by those source code changes.

Figure 1:
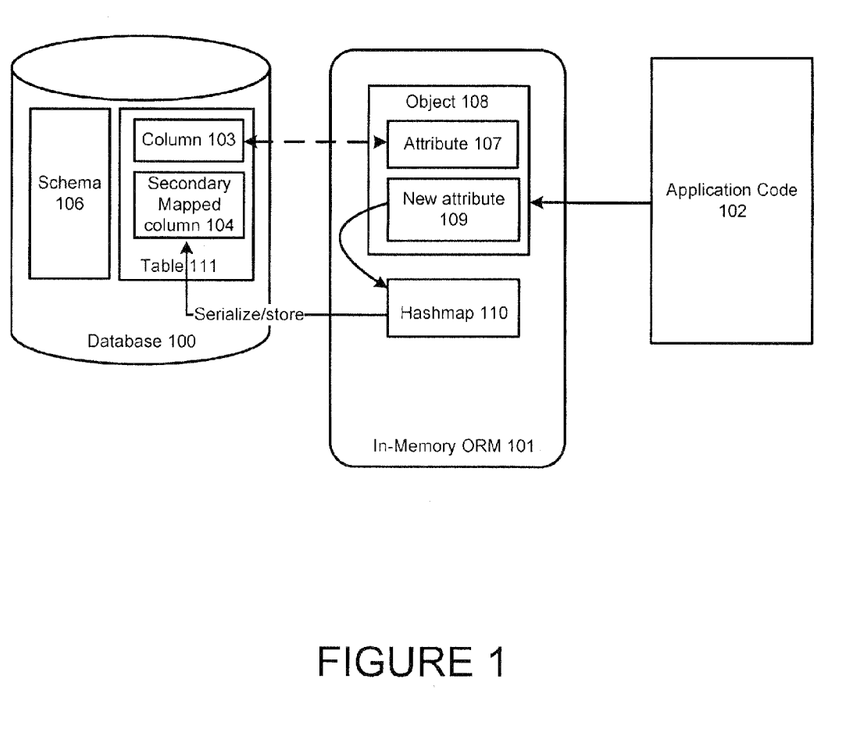
FIG. 1 illustrates an example of using secondary mappings in an ORM system, in accordance with various embodiments.

FIG. 1 illustrates an example of using secondary mappings in an ORM system, in accordance with various embodiments. As illustrated, the ORM system 101 defines a model object 108 that has attributes 107 that map one-to-one with database columns 103. For example, conventionally, if a developer wanted the object "widget" to have an attribute "category", the ORM system would need to annotate the model object with the annotation specifying that the model object contains the attribute "category" and furthermore, the database schema 106 would need to be updated to create a "category" column in the database 100 that is directly mapped to the "category" attribute of the object.

In accordance with the illustrated embodiment, to get around this requirement, the attribute of the object can be annotated with a secondary mapping annotation, indicating that the attribute 109 of object 108 can be a secondary mapped attribute. In order to enable this, a specially designated column 104 is added to the table 111 in the database that corresponds to ORM object 108. Alternatively, table 111 can be a separate database table specifically created and managed for storing secondary attributes. In accordance with an embodiment, column 104 is specifically designated to hold the values for all secondary mapped attributes (i.e. attributes of the object which have been annotated as being secondary mappable and for which there is no corresponding directly mapped column in the database).

When the ORM system receives an operation (e.g. read/write) from the application source code 102 that references an attribute of the object 108, it can first check whether there exists a corresponding primary mapped column for that attribute in the database. If there is no such column (e.g. the attribute is a new attribute 109 referenced in the source code), the ORM system re-maps the operation to reference a map 110 stored in-memory on the ORM system. Consequently, any writes performed by the application would be stored in the map and any reads would be performed on the values in the map. The values in the map 110 can be serialized and stored in the specially designated column 104 using a key that is based on the name of the new attribute 109. In this manner, column 104 can hold values for multiple attributes which were never defined to have corresponding columns in the database.

Figure 2:
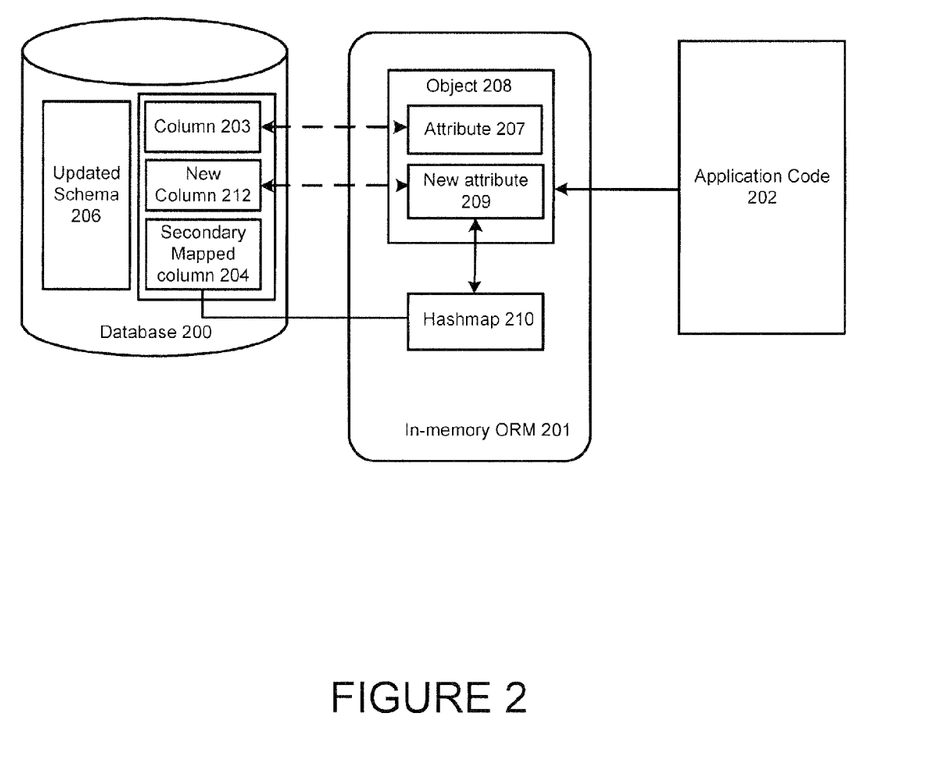
FIG. 2 illustrates an example of updating the database schema after using secondary mapped attributes, in accordance with various embodiments.

FIG. 2 illustrates an example of updating the database schema after using secondary mapped attributes, in accordance with various embodiments. As previously described, the ORM system 201 can contain mappings of various attributes 207 of the model object 208 to the corresponding column 203 in the database 200. As mentioned in FIG. 1, the ORM system has been using the hash map 210 to enable source code to reference attributes which had not previously been defined in the database.

In FIG. 2, however, after using the secondary mapped attribute, the database schema 206 may be updated to create the primary column 212 that is mapped to attribute 209. After the actual column for the attribute is added to the database, the ORM can seamlessly transition to use the new column 212 to store values for the attribute 209 instead of storing these values in the secondary mapped column 204.

In accordance with an embodiment, after the database schema is updated, reads can continue to be performed against the in-memory map 210. If the map 210 contains a value, the value from the map is returned as a result of the read operation. If there is no value present in map 210, the value from the actual column 212 is retrieved and returned as a result of the read operation.

In accordance with an embodiment, after the database schema is updated, write operations store values directly to the new column 212 and remove any mapped value from the in-memory map 210. Before storing the object to the database, the map 210 is inspected and any keys which are no longer necessary are removed and their value populated in the corresponding columns, then whatever values remaining in the map are serialized and stored in column 204.

In this manner, the secondary mapping annotations can be leveraged for initial implementations of source code changes and later be removed after the schema updates have been applied.

Figure 3:
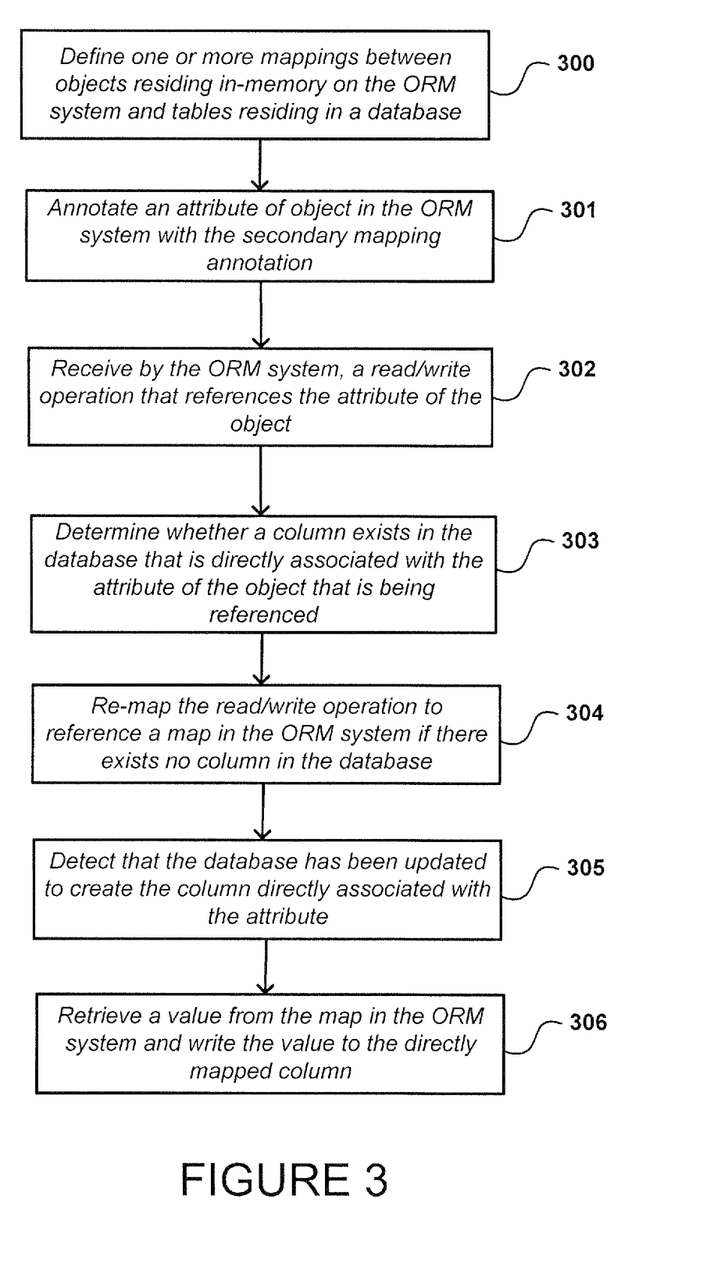
FIG. 3 illustrates an example process for using secondary mappings in the ORM system, in accordance with various embodiments.

FIG. 3 illustrates an example process for using secondary mappings in the ORM system, in accordance with various embodiments. Although this figure, as well as any other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

As shown in step 300, the ORM system defines mappings between objects and attributes residing in-memory on the ORM system and tables and columns stored in a database. For example, in many ORM systems, there is a one-to-one mapping between each attribute of the in-memory object and a column in the database.

In step 301, an attribute of an object in the ORM system is annotated with a secondary mapping annotation. In alternative embodiments, the entire object may be annotated with the secondary mapping annotation. In accordance with an embodiment, this annotation indicates to the ORM system that read/write operations referencing the annotated attributes of the object may need to be re-mapped if the attribute does not have a corresponding primary mapped column in the database. Thus, for example, if an attribute of an object being referenced by a piece of code does not have a corresponding equivalent column in the database, the operation will need to be remapped to a different location.

In step 302, the ORM system receives an operation that references an attribute of the object. For example, the operation can be a method invocation in the source code to read the attribute or to write an updated value to the attribute.

In step 303, the ORM determines whether a directly mapped column exists in the database that is associated with the attribute of the object that is being referenced. For example, if the method invocation is referencing an attribute "category" of object "widget", the ORM system can inspect the database and determine whether there is a corresponding column "category" in the table for "widget". In accordance with an embodiment, if the actual column exists in the database, the operation is simply passed through to the column and the value is either read or written to the directly mapped column.

In step 304, if there is no corresponding column in the database for the attribute being referenced, the ORM system remaps the operation to a secondary data structure (e.g. a map in-memory). The map can be a hash map that is serialized and stored in a special column which has been previously added to the database to contain all secondary mapped attributes for the object. In accordance with one embodiment, the designated column can be part of the database table that corresponds to the ORM object that contains the annotated attribute. For example, all tables that are eligible to use secondary mappings will have a special column added in the database, which will be used specifically for storing the values of all secondary mapped attributes. These values can be keyed and stored using the name of the secondary attribute (e.g. "category") for which the corresponding column has not been created yet in the database. In an alternative embodiment, the designated column can be part of a separate database that is specifically created for storing the secondary attributes. The use of a separate table could enable the system to store the secondary attributes directly without first encoding it into JSON.

In step 305, the ORM system can later detect that the database schema has been updated and that the directly mapped column has now been added to the database. For example, when the ORM is activated, it pulls the metadata for all the relevant tables. A hook can be added to the ORM which, when executed, inspects the model and determines that this model object has some secondary properties (e.g. contains values in the secondary mapped column). If the model object has secondary properties, the ORM can inspect the database to check if any of the actual directly mapped columns exist for any of the values in the secondary mapped column.

In step 306, if the primary mapped column has been added to the database, the ORM system can retrieve the values from the secondary mapped column and write those values into the primary mapped column. In accordance with an embodiment, this can be performed upon determining that the column has been added. Alternatively, the values can be maintained in the secondary mapped column and all future write operations can write the value to the primary mapped column. Once the value has been written to the primary mapped column, the values can be removed/cleaned up from the secondary mapped column.

Figure 4:
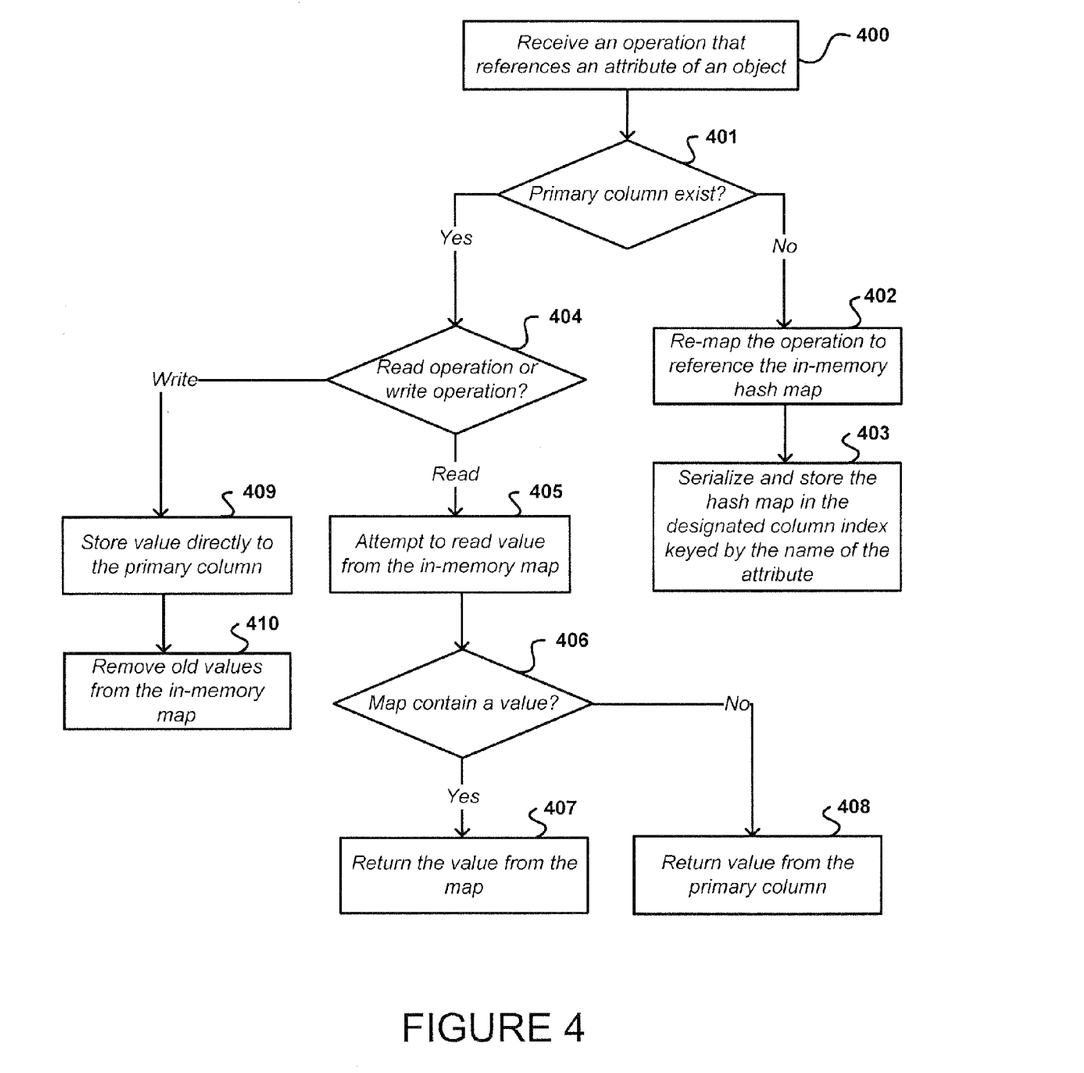
FIG. 4 illustrates an example logical implementation flow that the ORM can follow upon receiving an operation, in accordance with various embodiments.

FIG. 4 illustrates an example logical implementation flow that the ORM can follow upon receiving an operation, in accordance with various embodiments.

As shown in step 400, the ORM system can receive an operation that references an attribute of an object. For example, the operation can be a read or write operation. In step 401, a determination is made whether a primary mapped column for the attribute exists in the database. If the primary column does not exist, the ORM system automatically remaps the operation to reference the in-memory hash map (step 402). For example, if the operation is a write operation, the ORM system writes the value to the in-memory hash map. In accordance with an embodiment, the hash map is then serialized and stored in a specific column of the database that is designated for storing all secondary mapped attributes (step 403).

If the primary column does exist in the database, the ORM system can first determine whether the operation is a read operation or a write operation (step 404). As shown in step 409, when the primary mapped column exists, all write operations can write the values directly to the primary column. Once the new value has been written to the primary mapped column, any values can be cleaned up from the secondary mapped column, as illustrated in step 410.

If the operation is a read operation, the ORM system can first attempt to read the value from the in-memory map (e.g. hash map). If the map contains a value, that value can be returned as a result of the read operation (step 407). If the map does not contain a value, the ORM system can instead return the value from the primary mapped column (since it exists) as shown in step 408.

In accordance with various embodiments, the flow illustrated in FIG. 4 can be modified to account for concurrent access of the database by multiple ORM instances. To account for concurrent access, optimistic locking can be implemented for the tables in the database. For example, the attribute can be versioned to account for multiple ORM instances modifying the attribute.

In accordance with an embodiment, the ORM can cache the database metadata in memory in order to reduce latency. For example, the database schema containing information about the existence of various tables and columns in the database can be cached in each ORM instance at the time that the ORM instance is started. Thereafter, the ORM instances may need to invalidate the cached metadata in order to ensure that the primary column of the table does not exist and that the value should be stored as a secondary attribute. In accordance with an embodiment, this can be done at the time of adding a new key to the hash map. At the point in time when the new key is added, the cached metadata can be invalidated in order to ensure that the primary column does not actually exist and that the value should be stored as a secondary mapped attribute. This can allow multiple ORM instances to utilize the secondary mapped attributes while allowing concurrent access due to optimistic locking.

Figure 5:
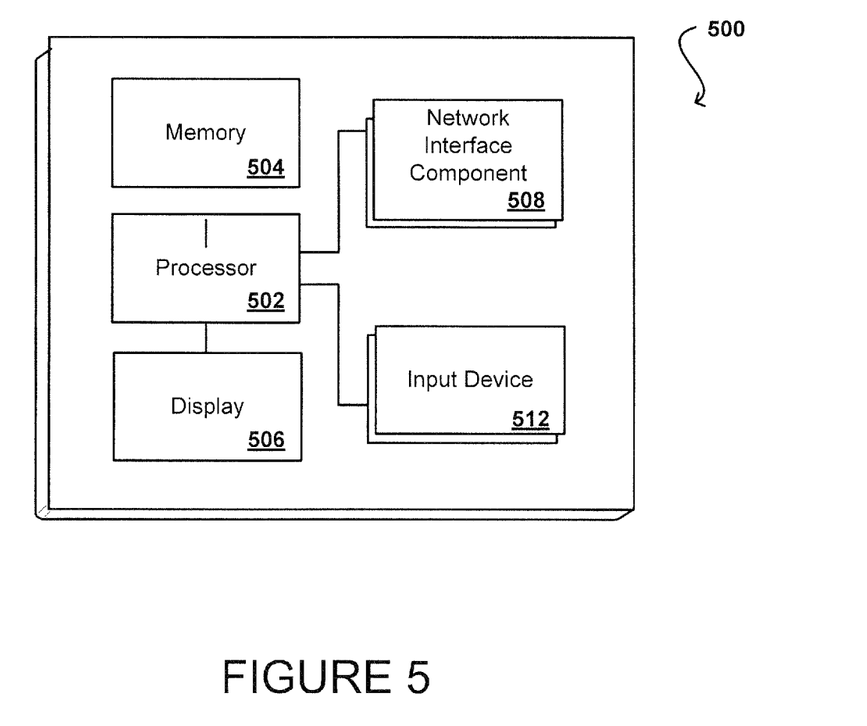
FIG. 5 illustrates a logical arrangement of a set of general components of an example computing device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
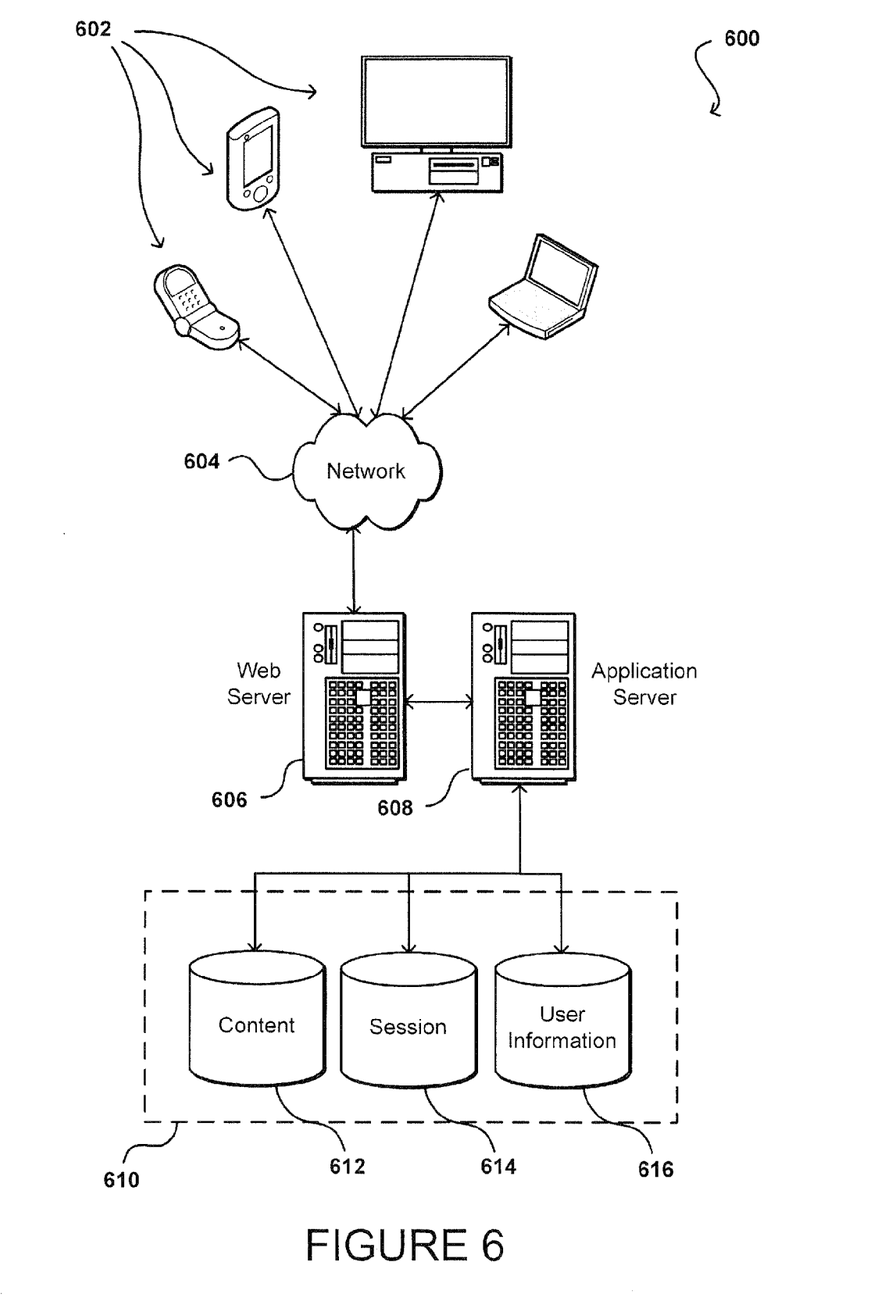
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for using mapping information to decouple code modifications from database schema updates, said method comprising:
    maintaining mappings between objects residing in an object relational mapping (ORM) system and tables residing in a database;
    annotating an attribute of an object in the ORM system with an annotation to generate an annotated attribute, the annotation indicating that the annotated attribute is capable of being stored as a secondary mapped attribute;
    receiving, by the ORM system, a read operation or write operation that references a specified attribute of the object;
    determining that the specified attribute referenced by the read operation or write operation corresponds to the annotated attribute of the object;
    determining that a first column exists in the database that is associated with the specified attribute of the object referenced by the read operation or the write operation;
    determining that a schema of the database has been updated to include the first column or if the first column does not exist, include a second column designated to store values for attributes that have been annotated with the annotation indicating secondary mapped attributes;
    mapping subsequent write operations to the first column in the database to generate a map in the ORM system; and
    removing the values in the second column.

2. The computer implemented method of claim 1, further comprising:
    re-mapping the read operation or the write operation to reference the map in the ORM system corresponding to the second column in the database;
    determining that the schema of the database has been updated to include the first column after re-mapping the read operation or the write operation to reference the map;

continuously executing subsequent read operations against the map in the ORM system until the values are removed from the map by the subsequent write operations; and continuously executing read operations against the first column after the values are removed from the map by the subsequent write operations.

3. The computer implemented method of claim 1, wherein the map in the ORM system is serialized and stored as an encoded hash map in the second column of the tables in the database that corresponds to the object in the ORM system.

4. The computer implemented method of claim 1, further comprising:

determining that the tables residing in the database are eligible to contain the secondary mapped attributes, wherein the tables further include the second column to store values for the secondary mapped attributes.

5. The computer implemented method of claim 4, further comprising:

storing the values from the secondary data structure into the second column using a key, the key based at least in part on a name of the attribute.

6. The computer implemented method of claim 5, further comprising:

inspecting the map;
identifying unused keys;
removing the unused keys; and
re-mapping the values from the second column to the first column.

7. The computer implemented method of claim 1, further comprising:

receiving concurrent access requests from multiple instances to access the database; and
modifying the annotated attribute with a version associated with the multiple instances.

8. A computing device comprising:

a processor; and
a non-transitory storage memory containing instructions executable by the processor to perform a method comprising:
    annotating a first object or an attribute of the first object in-memory to indicate a secondary mapping, annotating the first object to generate an annotated first object and annotating the attribute of the first object to generate an annotated first attribute;
    receiving an operation that references a second object or an attribute of the second object;
    determining that the second object or the attribute of the second object referenced by the operation corresponds to the annotated first object or the annotated first attribute;
    determining that the attribute of the first object is directly mapped to a first column in a database;
    referencing the operation to a secondary data structure corresponding to a second column in the database, the secondary data structure designated to store values for attributes marked as being capable of containing secondary mappings if the attribute of the first object is not directly mapped to the first column in the database;
    determining that a schema of the database has been updated to include the first column;
    mapping subsequent write operations to the first column in the database to create a map, the map including the secondary data structure;
    executing subsequent read operations based at least in part on the map;
    removing the values in the secondary data structure from the map by executing the subsequent write operations; and
    executing subsequent read operations based at least in part on the first column.

9. The computing device of claim 8, wherein the secondary data structure is serialized and stored as an encoded hash map in the second column of the database.

10. The computing device of claim 8, wherein the values from the secondary data structure are stored into the second column using a key based on a name of the attribute of the first object.

11. The computing device of claim 10, wherein the non-transitory storage memory contains instructions to perform the method further comprising:

inspecting the map;
identifying unused keys;
removing the unused keys; and
re-mapping the values from the second column to the first column.

12. The computing device of claim 8, wherein the non-transitory storage memory contains instructions to perform the method further comprising:

receiving concurrent access requests from multiple instances to access the database; and
modifying the attribute of the second object or the annotated first attribute with a version associated with the multiple instances.

13. The computing device of claim 8, wherein the non-transitory storage memory contains instructions to perform the method further comprising:

mapping the subsequent write operations to the first column; and
removing the values from the secondary data structure.

14. The computing device of claim 8, wherein the non-transitory storage memory contains instructions to perform the method further comprising:

caching metadata associated with the database to generate cached metadata.

15. The computing device of claim 13, wherein the non-transitory storage memory contains instructions to perform the method further comprising:

executing the subsequent read operations based at least in part on the secondary data structure;
removing the values from the secondary data structure by the subsequent write operations; and
executing the subsequent read operations based at least in part on the first column.

16. The computing device of claim 14, wherein the non-transitory storage memory contains instructions to perform the method further comprising:

invalidating the cached metadata;
storing the attribute of the second object as values of the secondary data structure; and
adding a new key to the map.

17. A non-transitory computer readable storage medium storing one or more sequences of instructions executable by one or more processors to perform a method comprising:

marking an object in-memory to indicate that the object is capable of containing a secondary mapping;
receiving a read operation or a write operation that references an attribute of the object;
determining that the attribute referenced by the read operation or the write operation corresponds to the object marked as being capable of containing the secondary mapping;

determining that the attribute is directly mapped to a first column in a database;
referencing the read operation or the write operation to a secondary data structure corresponding to a second column in the database, the secondary data structure designated to store values for attributes marked as being capable of containing secondary mappings if the attribute is not directly mapped to the first column in the database;
determining that a schema of the database has been updated to include the first column;
mapping subsequent write operations to the first column in the database;
executing the subsequent write operations; and
removing the values for attributes stored in the secondary data structure.

18. The non-transitory computer readable storage medium of claim 17, wherein the values from the secondary data structure are stored into the second column using a key based on a name of the attribute of the object.

19. The non-transitory computer readable storage medium of claim 18, the method further comprising:
inspecting the map;
identifying unused keys;
removing the unused keys; and
re-mapping the values from the second column to the first column.

20. The non-transitory computer readable storage medium of claim 19, the method further comprising:
caching metadata associated with the database to generate cached metadata;
invalidating the cached metadata;
storing the attribute of the object as values of the secondary data structure; and
adding a new key to the map.

* * * * *